United States Patent
Haertling et al.

[11] 3,744,875
[45] July 10, 1973

[54] FERROELECTRIC ELECTROOPTIC DEVICES

[75] Inventors: Gene H. Haertling; Carroll B. McCampbell, Jr., both of Albuquerque, N. Mex.

[73] Assignee: The United States of America as represented by the United States Atomic Energy Commission, Washington, D.C.

[22] Filed: Dec. 1, 1971

[21] Appl. No.: 203,701

[52] U.S. Cl. .................. 350/150, 350/157, 350/160
[51] Int. Cl. ......................... G02b 27/28, G02f 1/20
[58] Field of Search ................... 350/147, 150, 157, 350/160; 340/173.2, 173 SS

[56] References Cited
UNITED STATES PATENTS
3,666,666  5/1972  Haertling ............................. 350/150
3,512,864  5/1970  Haertling et al. ................... 350/150
2,936,380  5/1960  Anderson ............................ 350/150

*Primary Examiner*—John K. Corbin
*Attorney*—Roland A. Anderson

[57] ABSTRACT

An optical quality, slim-loop type, electrically induced ferroelectric ceramic plate made of essentially cubic phase, normally optically isotropic lead zirconate-lead titanate solid solution, an optically transparent, electrically conductive electrode disposed on each of the plate surfaces at locations in alignment through said plate, means for applying an electric field to the plate between the aligned electrodes to change said plate from the normal cubic phase to an induced ferroelectric phase and from the normal optically isotropic condition to an electrically induced anisotropic and birefringent condition, and means for sensing the change in optical condition.

5 Claims, 3 Drawing Figures

3,744,875

INVENTORS
GENE H. HAERTLING
CARROLL B. McCAMPBELL JR

BY

FERROELECTRIC ELECTROOPTIC DEVICES

BACKGROUND OF INVENTION

Polished plates of hot-pressed rhombohedral lead zirconate-lead titanate ceramics having fine or small grain sizes when electrically polarized are birefringent, and their light transmission characteristics are similar to those of optically uniaxial crystals. The effective birefringence of such polarized fine-grained ferroelectric ceramics is dependent upon the magnitude of electrical poling as well as on the intensity of the applied biasing electric fields. Retardation of the ceramic plate can be varied incrementally by partial switching or continuously by application of a non-switching bias field. Locally switched areas are stable with time and can be erased by switching them back to their original orientation. Such ferroelectric ceramics and electrooptical devices using them are described in U.S. Pat. Nos. 3,531,182 and 3,512,864.

These prior ferroelectric electrooptic devices generally used switching between two different azimuthal directions in a transverse (e.g., parallel to the major surfaces of the ceramic plate) mode to achieve desired retardation changes. When voltages were applied through the thickness of the plate in a longitudinal mode, the optical axis was aligned parallel to the direction of viewing and in such an arrangement, the conventional ferroelectric (rhombohedral or tetragonal) optical birefringent effects are at best minimal. Some conventional ferroelectric ceramic plates have been subjected to a strain biasing by pulling or pushing the plate uniaxially in the transverse direction and electrical switching voltages applied in the longitudinal thickness direction to achieve birefringent effects. The strain-bias longitudinal mode devices, of course, require some means to achieve strain biasing which in itself may unduly complicate the production and operation of the system.

The electrical switching or polarizing of these ferroelectric ceramic materials and the resultant birefringent effects are dependent upon the electric voltage and distance between electrodes. For example, a typical ferroelectric ceramic may require about 8 kilovolts/centimeter of material to achieve switching from a zero polarization state to a saturation remanent state. Because of this, prior transverse mode devices require ever increasing voltages to achieve switching of larger and larger apertures of material. Some prior devices partially compensated for this limitation by using a plurality of parallel electrodes and corresponding circuitry to switch the separate areas between the parallel electrodes and effectively construct a large aperture. All these prior devices, however, were limited in the aperture which they could provide by high voltage limitations in single aperture devices which often were not compatible with semiconductor low voltage circuit systems, or required very complex associated circuitry and electrodeposition techniques in multiple aperture devices.

SUMMARY OF INVENTION

In view of the above it is the object of this invention to provide a novel longitudinal mode essentially paraelectric ceramic electrooptic device.

It is a further object of this invention to provide an electrooptic induced ferroelectric ceramic device which is capable of wide aperture switching using low voltages and which is compatible with semiconductor circuitry including integrated circuits.

It is a further object of this invention to provide an induced ferroelectric ceramic electrooptic device which is easy to make and simple to operate.

Various other objects and advantages will appear from the following description of the invention, and the most novel features will be particularly pointed out hereinafter in connection with the appended claims. It will be understood that various changes in the details, materials and arrangement of parts, which are herein described and illustrated in order to explain the nature of the invention, may be made by those skilled in the art within the principles and scope of the invention.

The invention comprises an essentially cubic phase, hot-pressed, slimloop type, electrically induced ferroelectric ceramic plate with means for effecting longitudinal switching of the plate from its normal optically isotropic condition to an electrically induced anisotropic condition and for returning the plate to the isotropic state.

DESCRIPTION OF DRAWING

The invention is illustrated in the accompanying drawing wherein.

DETAILED DESCRIPTION

Figure 1:
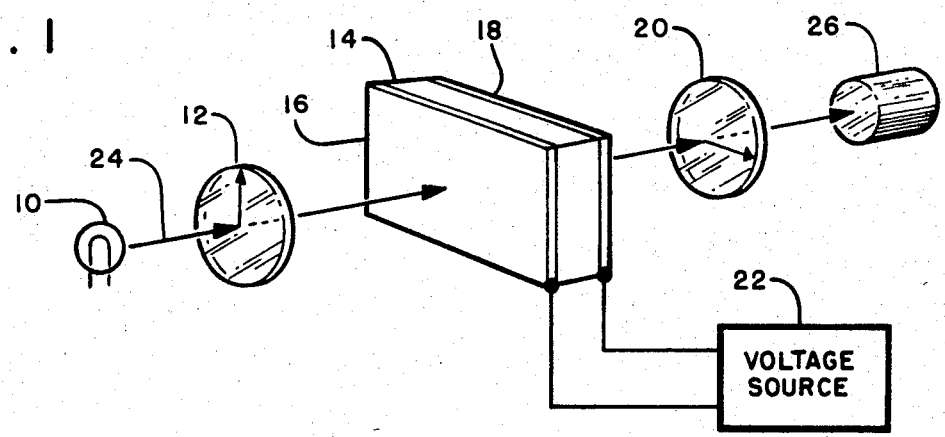
FIG. 1 is a perspective view of a longitudinal mode electrooptic essentially paraelectric ceramic device.

The basic device utilizes a monochromatic or white light source 10, a linear polarizer 12, a ceramic plate 14 having transparent electrodes 16 and 18 on its major surfaces, and an analyzer 20, that is, a second polarizer oriented at 90° to the polarizer 12. An appropriate direct current voltage source or power supply 22 may then be connected to electrodes 16 and 18 to provide an electric field to the portion of plate 14 between the electrodes. An alternating current source of sufficiently low frequency may be utilized in some applications.

Figure 3:
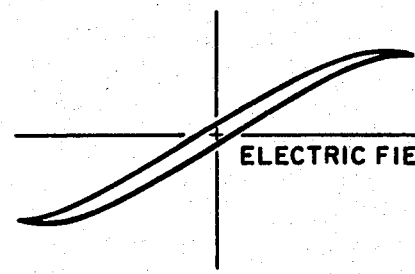
FIG. 3 is a graph of a hysteresis loop for a typical paraelectric ceramic material used in the device of FIG. 1.

The essentially paraelectric ceramic plate 14, in accordance with this invention, is made from a ceramic which has a narrow or slim-like hysteresis loop (slimloop) characteristic as shown in FIG. 3 which is, in its normal quiescent or unpolarized condition, of essentially cubic phase and optically isotropic condition or state exhibiting quadratic electrooptic effects. Generally, the preferred solid solution compositions lie along the phase boundary between the ferroelectric and paraelectric phase and, as such, are essentially paraelectric or cubic phase material, hereinafter referred to as paraelectric or cubic phase. Such materials, though possibly being of mixed phase, are normally optically isotropic in the quiescent condition. The "hysteresis loop" may be narrower or wider than shown, depending on the solid solution composition, so long as the material exhibits these properties. Such may typically be a hot-pressed paraelectric solid solution of appropriate constituents including lead zirconate-lead titanate with or without certain substitutions for lead, such as barium and lanthanum, and suitable additives. A particularly satisfactory solid solution is the lead lanthanum zirconate titanate solid solution having the general formula $Pb_{1-x}La_x(Zr_yTi_z)_{1-x/4}O_3$, where $x$ is between about 9 and about 25 atom percent with a ratio of $y/z$ of from about five ninety-fifths to about ninety-tenths. This compositional series is generally referred to as PLZT and exhibits good Kerr effect characteristics. Such materials are described in copending application S.N. 885,789 filed Dec. 17, 1969 by Gene Haertling for "Ferroelectric Ceramic Materials", now U.S. Pat. No. 3,666,666 dated May 30, 1972.

These ferroelectric ceramic compositions or solid solutions may be prepared by (1) weighing lead oxide, zirconia, titania and lanthana powder, (2) wet mixing the powders in a suitable liquid medium such as distilled water, (3) drying the wet mix powders, (4) calcining the dried powder mixture at a temperature of about 900° C for about 1 hour, (5) granulating or wet ball milling of the calcine to break down the partially sintered particle aggregates, (6) drying the wet milled calcine, and (7) compressing the resulting powder into a slug. The slug may then be further processed by hot-pressing at a temperature of from about 800° C to about 1,300° C for about 1 to 64 hours at a pressure of from about 500 to 20,000 psi in an appropriate hot-pressing apparatus. Improved optical clarity may be achieved by providing an oxygen atmosphere about the slug as it is being hot-pressed, though in many cases a suitable product may be achieved by hot-pressing under air. After hot-pressing, the finished slugs may be sliced into thin wafers or plates and the major surfaces polished to an optical quality finish (e.g., polished to approach optical smoothness and flatness). The plates may then be annealed at from about 500° to 700° C for about 15 minutes, cooled to room temperature, and appropriate electrodes positioned or plated thereon, such as covering the entire major surfaces as shown in FIG. 1. The prepared wafers or plates have generally parallel optical quality surfaces of substantially greater dimension than the cross section or distance between the major surfaces between which electrical polarization is desired. It will be understood, as described below that other variations and electrical configurations or patterns may be used on one or both of the major surfaces as deemed desirable for the use to which the device is to be applied.

When the voltage source 22 provides an appropriate voltage across electrodes 16 and 18, the portion of the plate 14 between the electrodes is switched from the normal cubic phase to an electrically induced ferroelectric phase, probably tetragonal, and from the normal optical isotropic condition to an electrically induced anisotropic condition. When the voltage is removed or terminated, the material or ceramic returns to the normal cubic phase and optically isotropic condition. With the ceramic in the cubic phase, a beam 24 of light from light source 10 polarized by polarizer 12 in the direction of the arrow of polarizer 12 is not affected by the plate so that the analyzer 20 produces an extinction condition due to its 90° orientation with respect to polarizer 12. With the ceramic in the anisotropic condition under the influence of the electric field between electrodes 16 and 18, plain polarized light from polarizer 12 is depolarized via scattering, such as by random retardation effects of individual crystallites and the like, in plate 14. Light transmitted through plate 14 is essentially depolarized and a portion of the light may be viewed through analyzer 20 by appropriate means 26. The extinction ratio between the cubic phase ("off" condition) and the induced ferroelectric phase ("on" condition) is a function of the extinction ratio of the polarizer 12 and analyzer 20, the optical quality of plate 14 and the depolarization effects in plate 14 with the field applied. Extinction ratios as great as 700 to 1 and higher have been produced.

This longitudinal, cubic-to-ferroelectric phase, light scattering effect may also be observed and utilized by eliminating polarizer 12 and analyzer 20. In such an arrangement, the utilization means 26 may sense an "on" condition in the cubic phase and an "off" condition in the field induced ferroelectric phase. In this type of arrangement, the extinction ratios may be somewhat less than the arrangement with crossed polarizer and analyzer.

Variations in light intensity may be obtained by selecting a proper electric field between the off condition and the full on condition, somewhere along the hysteresis loop shown in FIG. 3. The electric field required for a full on condition is dependent upon the composition or solid solution used and may vary from about 10 to 30 kilovolts/centimeter of plate thickness. Since the polarization is dependent on the thickness of the material or ceramic being polarized, it will be apparent that the amount of field needed to switch the ceramic from an off to an on condition may be decreased by use of relatively thin plates, for example, a PLZT of 9/65/35 (La/Zr/Ti) of 0.0075 centimeters thickness and about 1 square centimeter in area may only require about 100 volts to be switched from the full off to the full on condition. Such switching may be achieved with any desired size of "shutter" opening, such as typically 10 square centimeters or more, without any increase in voltage. In addition, this switching may be achieved with very low currents, in the neighborhood of about 10 to 500 microamperes, respectively and may be completed in less than about 10 to 100 microseconds depending on the composition. These devices may be used as displays, shutters and variable intensity diffused light windows with single or multiple transparent electrodes on one major surface and one or more transparent or reflective electrodes on the other surface in proper alignment therewith.

Figure 2:
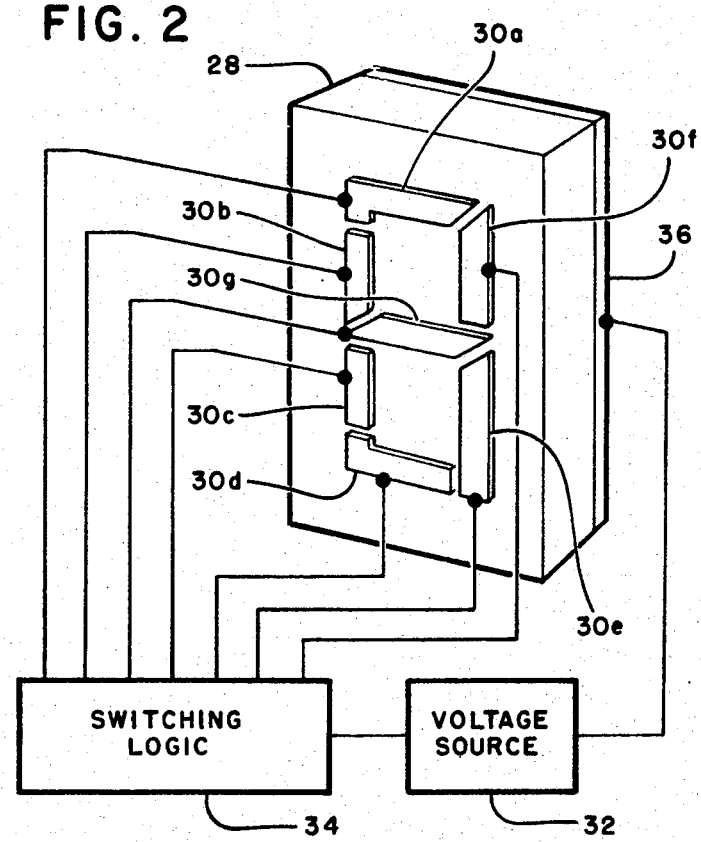
FIG. 2 is a diagrammatic view of an alphanumeric display device employing this electrooptic arrangement and the longitudinal mode of operation.

FIG. 2 illustrates an electrooptic device utilizing this invention to provide an alphanumeric display. In this device, the electrodes on one of the major surfaces of a paraelectric ceramic plate 28 (that is a ceramic plate which is of slim-loop and cubic phase described above) is provided with a predetermined array or pattern of electrodes 30a, 30b, 30c, 30d, 30e, 30f and 30g which may be selectively energized with an electric field bias from voltage source 32 and switching logic 34 together with the electrode 36 aligned with or covering the other major surface of plate 28. The desired electric fields provide symbolic patterns, such as numerals or letters, when plate 28 is positioned, with or without suitable crossed polarizer and analyzer, in a similar arrangement shown in FIG. 1.

Spatial addressing of individual segments or locations may also be achieved by sandwiching a photoconductive layer between one or more of the electrodes and the ceramic plate. When a beam of collimated light is directed against the electrodes and photoconductive layer or layers with an electric voltage applied to the electrodes, the ferroelectric ceramic material aligned with the light beam may be switched from one state to another. By proper selection of photoconductive material and electrode materials (such as polyvinyl carbazole and indium oxide respectively) the electrical charge carriers at these locations in the photoconductor material may be "trapped" or impeded thereat indefinitely, or for various time periods, when the voltage is removed to effectively "store" information or an image in the electrode-photoconductor-ferroelectric sandwich. This "stored" charge, and the information it represents, may be viewed later by projecting a beam of light through the ferroelectric ceramic plate arrangement, without application of an electric field to the ceramic plate. Since the light beam may tend to cause the charge to dissipate, the photoconductor material or composition, such as certain solid solutions of polyvinyl carbazole and 2,4,7, trinitro-9-fluoroene, may be appropriately selected to be sensitive to certain wavelengths of light for storing an image with different wavelengths of light used to read the stored image.

What is claimed is:

1. An electrooptic device consisting of a slim-loop, essentially paraelectric, optical quality and normally optically transparent ceramic plate having generally parallel optical quality surfaces, said ceramic plate being a cubic phase, normally optically isotropic lead zirconate titanate solid solution exhibiting quadratic electrooptic effects; an optically transparent, electrically conductive electrode disposed on each of said parallel plate surfaces at locations in alignment through said plate; means for applying an electric field to said electrodes through said plate locations between said electrodes for switching the portion of said plate between said electrodes from said cubic phase to a ferroelectric phase and from said optically isotropic condition to an electrically induced anisotropic condition and for terminating said field for returning said plate portion to said cubic phase; and means for supplying light to said plate through said aligned locations.

2. The device of claim 1 including optical means for sensing the change in said plate between said electrically induced anisotropic condition and said optically isotropic condition.

3. The device of claim 2 wherein said sensing means includes a polarizer positioned between said light supplying means on one side of said ceramic plate and an analyzer disposed optically at an angle of 90° with respect to said polarizer adjacent the other side of said ceramic plate in optical alignment with said light source, polarizer and ceramic plate.

4. The device of claim 1 wherein said electrodes cover a substantial portion of said optical quality surfaces of said ceramic plate.

5. The device of claim 1 including a plurality of elongated electrodes on at least one of said surfaces and positioned in a predetermined array and wherein aid switching means includes means for applying electric fields between selected of said elongated electrodes and the electrode on said other plate surface to switch selected portions of said plate in symbolic patterns.

* * * * *